United States Patent
Chang et al.

(10) Patent No.: US 12,549,450 B2
(45) Date of Patent: Feb. 10, 2026

(54) SYSTEMS AND METHODS FOR CONVERGED BASEBAND AND AI OPERATIONS

(71) Applicant: EdgeQ, Inc., Santa Clara, CA (US)

(72) Inventors: Tae Ryun Chang, San Ramon, CA (US); Chaekwan Lee, San Jose, CA (US)

(73) Assignee: EdgeQ, Inc., Santa Clara, CA (US)

( * ) Notice: Subject to any disclaimer, the term of this patent is extended or adjusted under 35 U.S.C. 154(b) by 166 days.

(21) Appl. No.: 17/369,581

(22) Filed: Jul. 7, 2021

(65) Prior Publication Data

US 2023/0011602 A1    Jan. 12, 2023

(51) Int. Cl.
*H04L 41/16* (2022.01)
*H04W 24/02* (2009.01)
*H04W 28/02* (2009.01)
*H04W 28/16* (2009.01)
*H04W 88/12* (2009.01)

(52) U.S. Cl.
CPC ............. *H04L 41/16* (2013.01); *H04W 24/02* (2013.01); *H04W 28/0268* (2013.01); *H04W 28/16* (2013.01); *H04W 88/12* (2013.01)

(58) Field of Classification Search
CPC .. H04L 41/16; H04W 24/02; H04W 28/0268; H04W 28/16; H04W 88/12
See application file for complete search history.

(56) References Cited

U.S. PATENT DOCUMENTS

| | | | |
|---|---|---|---|
| 2019/0086988 A1* | 3/2019 | He | ........................ G06F 1/3212 |
| 2019/0140908 A1 | 5/2019 | Ma | |

(Continued)

FOREIGN PATENT DOCUMENTS

KR    102172866 B1    4/2018

OTHER PUBLICATIONS

International Search Report and Written Opinion of the International Searching Authority mailed Sep. 23, 2022 in related PCT application No. PCT/US22/36275, (11 pgs).
Instructions to abandon European application mailed Apr. 29, 2025 in related European patent application No. 22 838 363.4, 1 pg.
European search report mailed Apr. 17, 2025 in related European patent application No. 22 838 363.4, 11 pgs.

*Primary Examiner* — Asad M Nawaz
*Assistant Examiner* — Najeeb Ansari
(74) *Attorney, Agent, or Firm* — Michael North

(57) ABSTRACT

With advanced compute capabilities and growing convergence of wireless standards and artificial intelligence (AI) applications, there is a requirement to run multiple wireless standards, e.g., 4G LTE, 5G NR and Wi-Fi, and AI on a single hardware together. Typical solutions include reserving some compute resources for specific wireless standards and a dedicated AI resource due to different precision compared to baseband processing. Typical solutions for signal processing with converged wireless standards and machine learning (ML) applications include having dedicated hardware acceleration and reserving some commutating or processing resources for specific wireless standards and a dedicated AI operation. Such approaches result in inefficient use of resources and lack of operation flexibility. The present patent document discloses embodiments to leverage commonalities in hardware acceleration for converged baseband and AI operators, thus achieving improved efficiency in power consumption and improved hardware resources utilization.

17 Claims, 6 Drawing Sheets

(56) References Cited

U.S. PATENT DOCUMENTS

| | | | |
|---|---|---|---|
| 2020/0145842 A1* | 5/2020 | O'Shea | H04W 24/04 |
| 2020/0163003 A1 | 5/2020 | Shahar et al. | |
| 2021/0014177 A1 | 1/2021 | Kasichainula | |
| 2021/0109668 A1* | 4/2021 | Kale | G06F 3/0604 |
| 2021/0119848 A1 | 4/2021 | Ibars Casas et al. | |
| 2021/0184795 A1 | 6/2021 | Ibars Casas et al. | |
| 2021/0185700 A1* | 6/2021 | Pezeshki | H04W 72/12 |
| 2022/0145842 A1* | 5/2022 | Burke | F02N 11/10 |
| 2022/0272001 A1* | 8/2022 | Mayor | H04L 41/0631 |
| 2022/0400371 A1* | 12/2022 | Elshafie | H04L 25/0226 |
| 2023/0010512 A1* | 1/2023 | Sharma | H04L 47/25 |
| 2023/0318904 A1* | 10/2023 | Gatherer | H04L 41/16 455/418 |

\* cited by examiner

SYSTEMS AND METHODS FOR CONVERGED BASEBAND AND AI OPERATIONS

TECHNICAL FIELD

The present disclosure relates generally to unified hardware acceleration that allows implementing different wireless standards and machine learning. More particularly, the present disclosure relates to systems and methods for converged baseband and AI operations on unified hardware acceleration.

BACKGROUND

The importance of wireless communication in today's society is well understood by one of skill in the art. Advances in wireless technologies have resulted in the ability of a communication system to support wireless communications of different standards, e.g., 5G New Radio (NR), 4G LTE, Wi-Fi, etc. Different wireless standards have aspects which are very different from each other—fundamental frame structures, timing of symbols, forward error correction (FEC) codes.

In the meantime, artificial intelligence (AI) or machine learning (ML) has been applied to various applications, such as autonomous driving, Internet of Things (IoT), edge computing, etc. Some of those applications may also involve data flow processed or transmitted using a wireless communication system.

Typical solutions for signal processing with converged wireless standards and AI applications include having dedicated hardware acceleration and reserving some commutating or processing resources for specific wireless standards and a dedicated AI operation. However, such approaches result in inefficient use of resources and lack of operation flexibility.

Accordingly, what is needed are systems, devices and methods that address the above-described issues.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
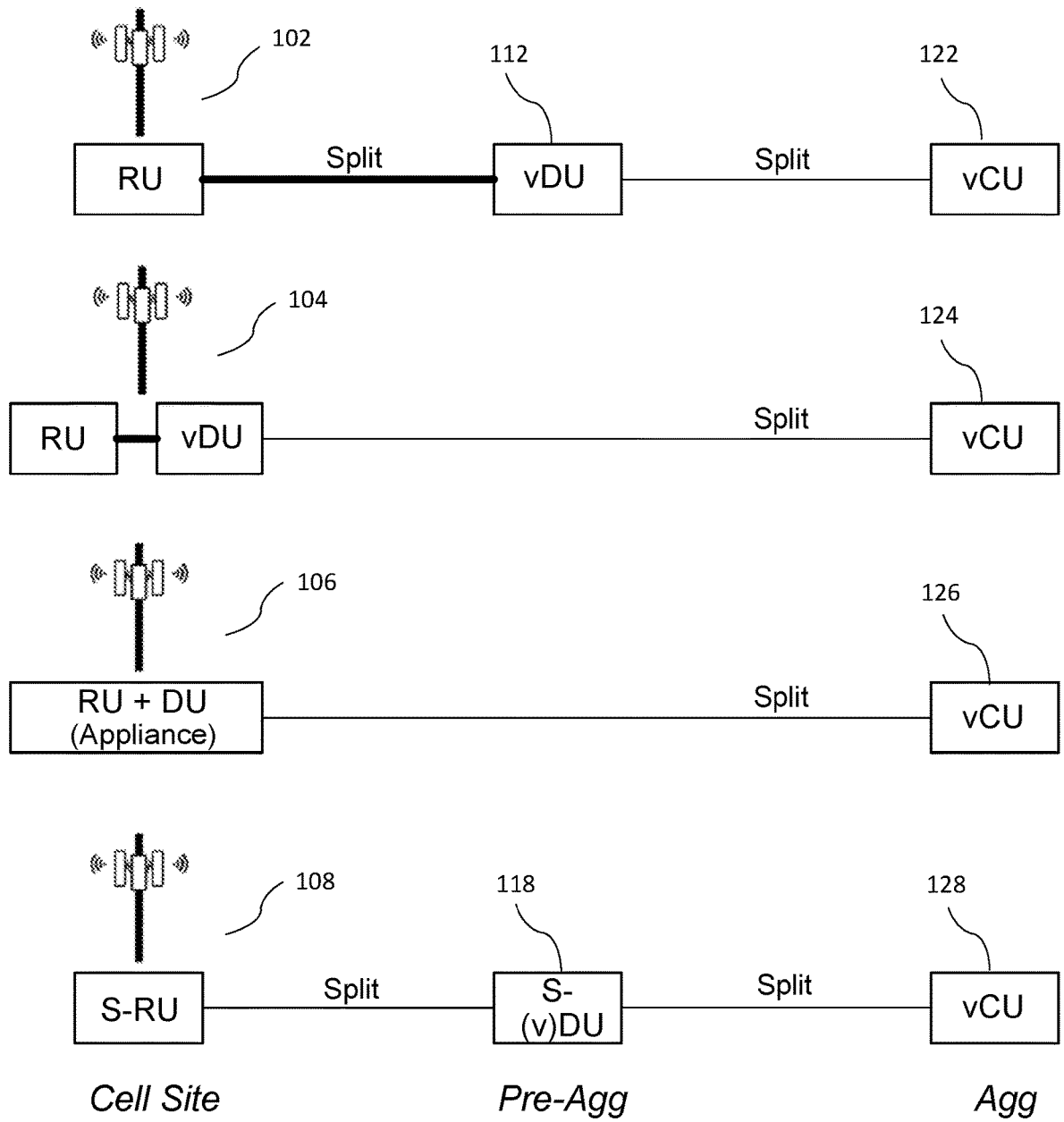
FIG. 1 ("FIG. 1") depicts various open radio access network (RAN) deployments for a telecommunication service provider, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" or "packet" shall not be interpreted as limiting embodiments of the present invention to 5G networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

A. Open RAN Deployment Models

A radio access network (RAN) is part of a telecommunication system. It implements a radio access technology (RAT) to provide connection between a device, e.g., a mobile phone, and a core network (CN). Open RAN is an approach based on interoperability and standardization of RAN elements including a unified interconnection standard for white-box hardware and open source software elements from different vendors.

FIG. 1 depicts various open radio access network (RAN) deployments for a telecommunication service provider, according to embodiments of the present disclosure. As shown in FIG. 1, a radio unit (RU) 102 may couple to a virtual distribution unit (vDU) 112 with a split, e.g., ORAN 7-2 split, which is a Low PHY/High PHY split for ultra-reliable low-latency communication (URLLC) and near-edge deployment. The vDU 112 then couples to a virtual central unit (vCU) 122 with a split, e.g., split 2, which is referred as radio resource control and packet data convergence control split from the Layer 2 radio link control (RLC). Alternatively, a vDU may be deployed on the side of an RU 104, and then couples to a vCU 124 with a split, e.g., split 2. Alternatively, a distribution unit (DU) and an RU may be integrated as an appliance 106, which then couples to a vCU 126 with a split, e.g., split 2. Alternatively, a RU may be a small cell RN (S-RU) 108 couples to a small cell DU or vDU (S-vDU) 118 using a split, e.g., a MAC/PHY layer split (split 6). The S-vDU 118 then couple to a vCU 128 with a split, e.g., split 2.

A service provider (SP) may adopt more than one Open RAN deployment models based on band, fronthaul bandwidth requirements, or deployment type (macro/small cell), etc. Deployment models are influenced or decided based on multiple factors, including Fibre availability, real-estate/site/ location constraints at pre-aggregation (Pre-Agg) and cell sites, total cost of ownership (TCO), Operational preference, etc. It is desirable for SPs to achieve maximum consistency around architecture, systems and operational model across all these deployment models.

With the continuous development of Wi-Fi technology, Wi-Fi access points (APs) may transmit or receive signals at a frequency (e.g., 2,4 GHz, 5 GHz, or 6 GHz) within the frequency range 1 (FR1) for 5G communications. An RU serving 5G communications may also be configured for transmitting or receiving 5G Wi-Fi signals. Accordingly, a 5G base station or a 5G small cell may be deployed to serve both 5G and Wi-Fi communications. However, using specialized or separate hardware to separately process the 5G and Wi-Fi standards would result in complex hardware, increase power consumption for operation, and drive up the cost of the of the whole system. It would be desirable to have a unified or at least partially unified signal processing path that may be configured to process different wireless standards or different operations to reduce system complexity and improve operation efficiency.

B. Embodiments of Converged Baseband and AI Operations 5G services are expected to cover Macro overlays, Small cells, low latency applications in industries and machine to machine communications. Each mode has its unique requirement. In 5G deployments, different components of the network are being envisioned—complete gNB, RU/DU with fronthaul. An RU has RF operations and also some low-level baseband PHY operations. The information from RU is communicated as frequency domain data via a protocol called eCPRI (enhanced Common Public Radio Interface) over Ethernet to a DU. The DU implements most of the baseband PHY stack which is compatible for the 5G or 4G/LTE standards and for proprietary expansions. The DU may also host upper layer operations of MAC, scheduler, and RLC. The location or destination to deploy these components in a network may be determined by aggregation capability and resource availability, such as the fronthaul throughput and latency. Multiple sectors or RUs may be aggregated into a DU which runs baseband functions for them. In some other situations, in a small cell, these baseband functions may converge into a single gNB component.

Figure 2:
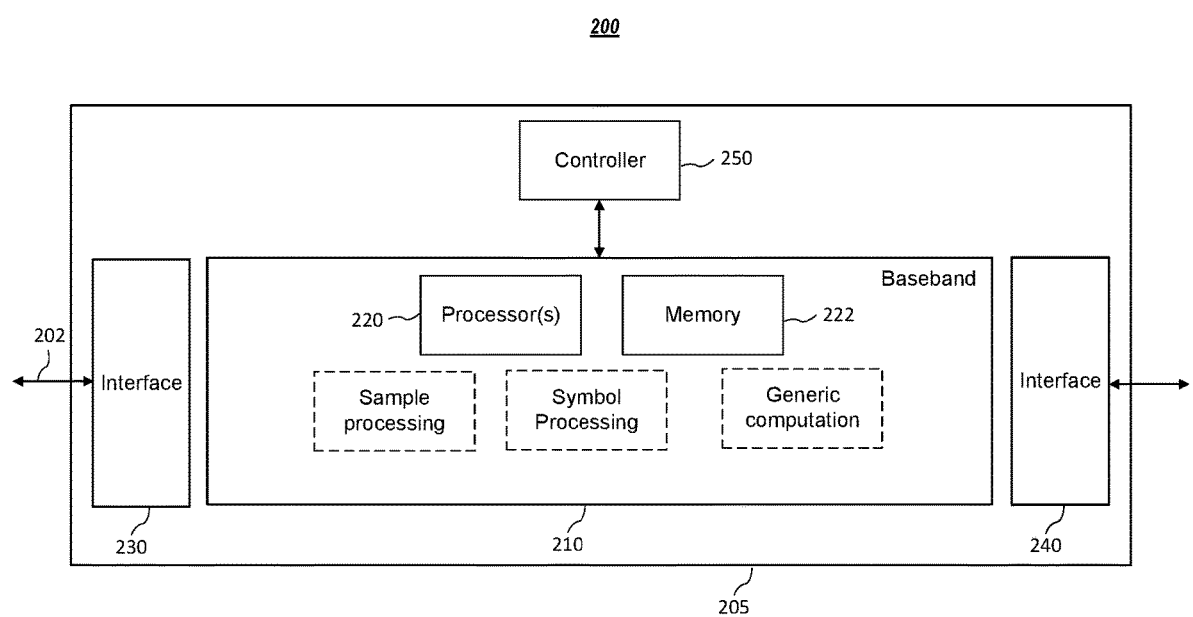
FIG. 2 depicts a block diagram of programmable modem tasks for processing signals across different wireless standards, according to embodiments of the present disclosure.

In one or more embodiments of the present disclosure, certain software implementations for signal processing across different wireless standards and AI operations may be integrated together on a single converged modem 210 in a signal processing system 205, as shown in FIG. 2. The converged modem 210 is configurable to transmit or receive wireless signals 202 via one or more interfaces 230, e.g., a digital or analog radio interface (I/F) and/or an O-RAN Front Haul interface, etc. The programmable modem 210 may be software-configurable to perform one or more wireless-standard-specific baseband operations (shown as blocks with dashed line in FIG. 2), e.g., sample processing, symbol processing, etc., and generic computation, etc. The converged modem 210 may also couple to an interface 240, such as a Host Peripheral Component Interconnect Express (PCIe) interface, for host communications.

The converged modem 210 may comprise one or more processors 220 (e.g., a multi-core microprocessor) and a memory 222. Computation resources associated with the one or more processors 220 and the memory 222 may be distributed among baseband operation and AI operation. The resource distribution may be dynamically determined or pre-determined. The converged modem 210 couples to a controller 250 (e.g., a host) to receive instructions for desired operations, e.g., computation resource allocation for BB and/or ML operation, interval scheduled for each operation, etc. In one or more embodiments, the instructions may comprise instruction extension for additional information, e.g., an indication of whether the incoming data flow is BB dataflow, ML dataflow, or a mixture of both. The instruction extension may be used by the modem for proper library based clock gating, on-the-fly instruction generation, efficient scoreboard, in-order execution of HW configuration and data processing, memory bandwidth sharing, phase ramp generation for the modulation and FFT twiddle factor generation, Scatter/Gathering support for memory LD/ST operation, efficient memory access with stride-mode access, operation reduction (e.g. multiple reduced sum, multiple reduced min, multiple reduced max), register file element shuffling, parallel load/store (LD/ST) operation, and flow control, etc. Exemplary instructions for BB operation may comprise umult*, umvmult*, ummult*, upwpoly*, uadd*, etc. Exemplary instructions for ML operation may comprise ucoonvb, upwpoly*, uadd*, etc. While some instructions may be BB or ML specific, some instructions may be shared between two operations.

Typically, a physical layer implementation of a wireless standard and ML involves many operation, including fast Fourier transform (FFT)/discrete Fourier transform (DFT), complex modulations, non-linear functions, matrix decompositions, matrix/vector operation, function specific acceleration, convolution/2D convolution, etc. While there are variations in each wireless standard and ML applications, some of the hardware accelerations have commonality, e.g., FFT for NR, LTE and Wi-Fi, matrix/vector operation for channel estimation and equalization, operations involving non-linear functions including arc tangent (atan), inverse, inverse-square-root, logarithmic function, exponential function, etc. The present patent document discloses embodiment to leverage the commonalities in hardware acceleration for improved efficiency in power consumption and improved hardware resources utilization.

Figure 3:
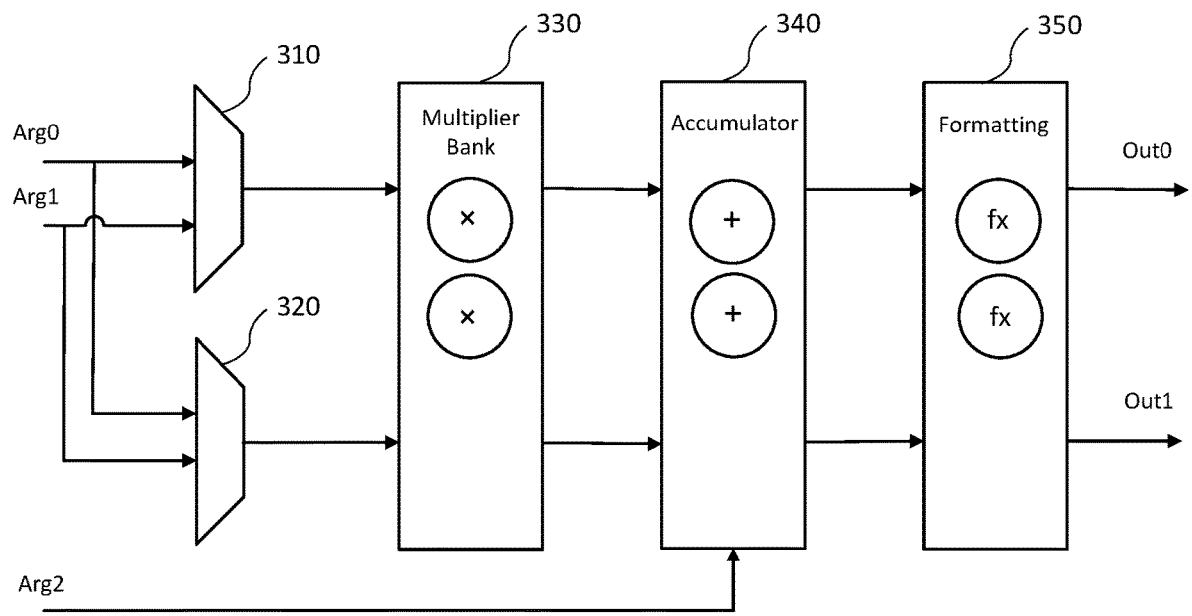
FIG. 3 depicts simplified baseband (BB) and ML pipelines, according to embodiments of the present disclosure.

FIG. 3 depicts simplified baseband and ML pipelines, according to embodiments of the present disclosure. The pipelines may comprises a plurality of multiplexers, e.g., 310, 320, a multiplier bank 330 comprising multiple multipliers, an accumulator block 340 supporting multiple accumulation operations, and a formatting block 350 supporting various functional operations (fx) including reformatting for desired data format. Dataflow for baseband or ML (e.g., Arg0, Arg1, or Arg2 shown in FIG. 3) may take respective route for desired operations to generate respective output (e.g., Out0, or Out1).

As shown in FIG. 3, the most common operations at primitive level include adders and multipliers. While BB applications may require complex (real and imaginary) multiplications with higher precision (e.g., 16 bits), ML applications may require real multiplications with lower precision (e.g., 8 bits). In the present patent documents, embodiments of a mechanism to break a complex multiplier to a series of real multiplications followed by appropriate accumulation are described. Such a mechanism may allow hardware optimization on the chip to support both BB and ML applications. Memory banks may also be organized to support these applications. The memory bank may be configured to support both BB (e.g., in 16/32 bits) and ML (e.g., in 8 bits) modes without changing any memory structure.

Figure 4:
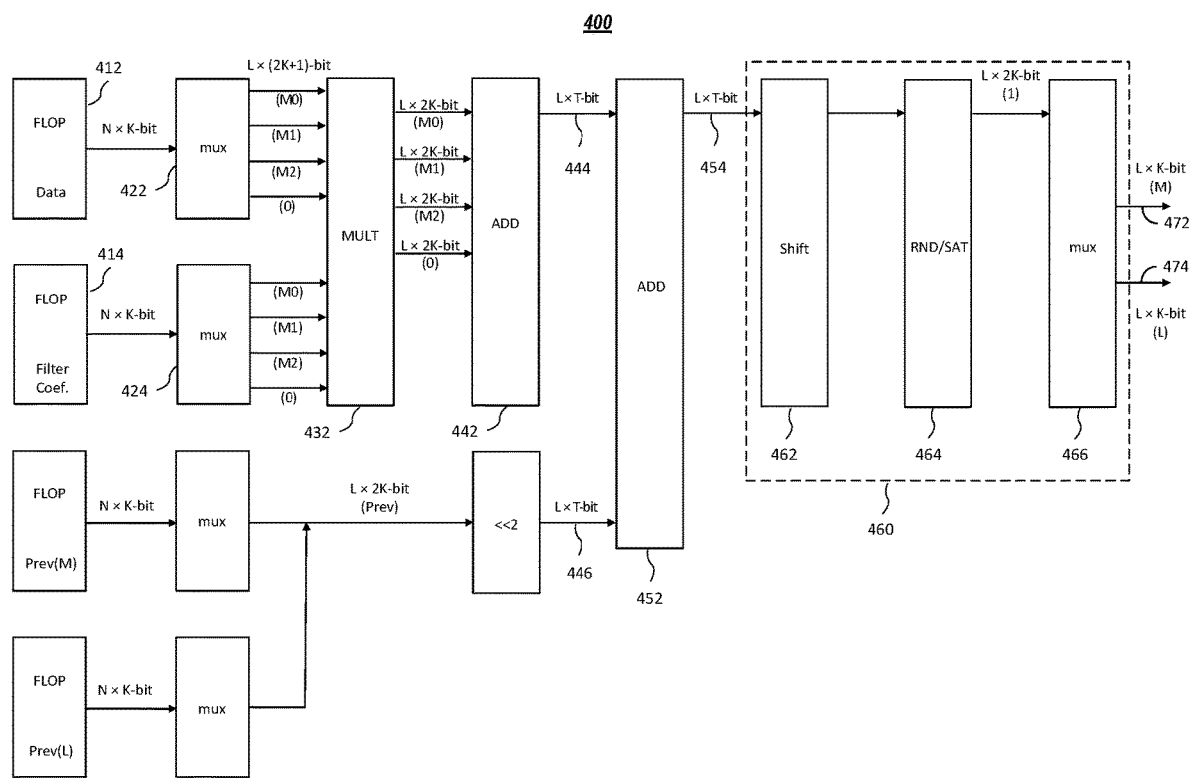
FIG. 4 depicts a detailed exemplary ML data path, according to embodiments of the present disclosure.

ML application may need to process not only multiplication/accumulation (MAC) but also various nonlinear functions, e.g., atan, inverse, inverse-square-root, logarithmic function, and exponential function, etc. ML operation also involves sigmoid/ReLu for activations. In one or more embodiments, first, second, or high order interpolation for nonlinear functions using programmable tables may be used for implementation. FIG. 4 depicts a detailed exemplary ML data path, according to embodiments of the present disclosure. As shown in FIG. 4, a date block 412 (e.g., for image data), filter coefficient data block 414, are processed via respective multiplexers (mux) 422 and 424, followed by a multiplier bank 432, an accumulator block 442 to obtain an intermediate output 444. The intermediate output 444 is added together with previous layer data 446 in another accumulator block 452 to obtain an added output 454, which is then processed in a formatting block 460 for final data output. In one or more embodiments, the formatting block 460 may comprise a shifter block 462 for shifting operation, a Round (RND)/Saturation (ST) block 464, and a final multiplexer 466 to output the final output, which may comprise a data block (M) 472 and a data block (L) 474 in desired format (e.g., in 8 bits). The RND/ST block 464 may implement operation for format conversion that may include any types of RND/ST, e.g., asymmetric (ASYM) or symmetric (SYM). When the formatting block 460 returns extended output (i.e. a 16-bit intermediate output from an 8-bit input), the data block (M) 472 represents MSB part of the extended output (MSB 8 bits) and the data block (L) 474 represents LSB part of it (LSB 8 bits).

Figure 5:
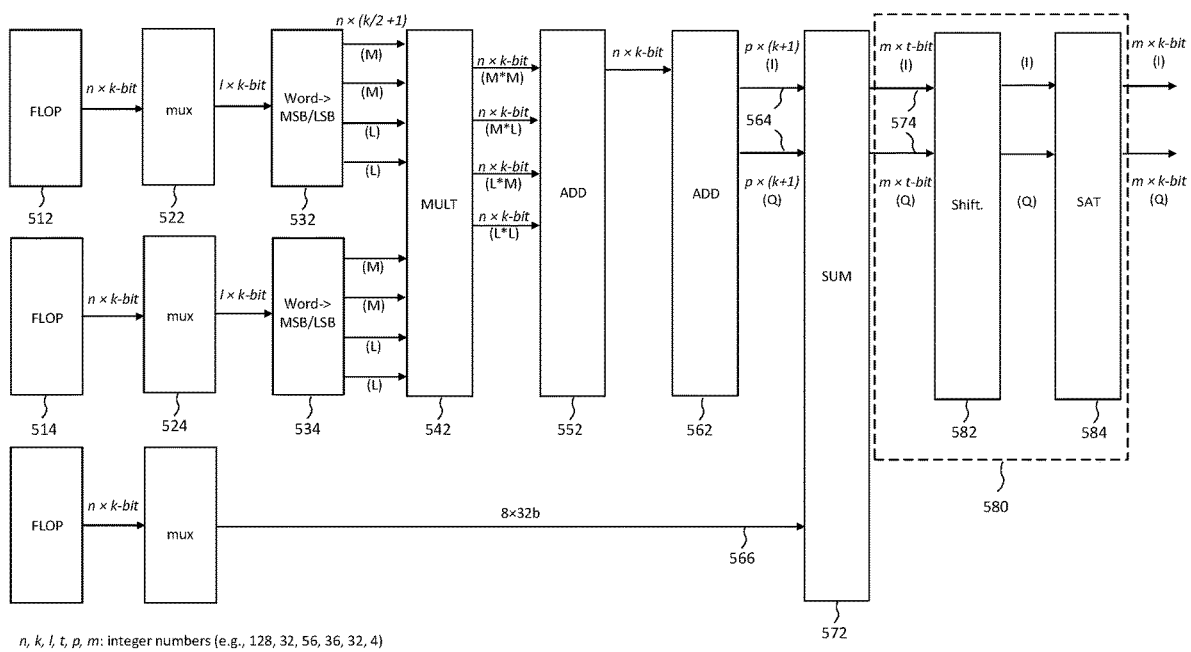
FIG. 5 depicts a detailed exemplary BB data path, according to embodiments of the present disclosure.

FIG. 5 depicts a detailed exemplary BB data path of backward substitution, according to embodiments of the present disclosure. As shown in FIG. 5, input date blocks 512 and 514 are processed via respective mux 522 and 524, followed by respective word split blocks 532 and 534, a multiplier bank 542, accumulator blocks 552 and 562 to obtain an intermediate output 564. The intermediate output 564 is added together with another intermediate data 566 in another accumulator block 572 to obtain an added output 574, which is then processed in a formatting block 580 for final data output. The split blocks 532 and 534 split a WORD (e.g., 32 bit data) to MSB (M)/LSB (L) part (e.g., 16 bit each). Each MSB (M)/LSB (L) part may be attached a 1-bit sign for MSB or LSB indication. Accordingly, the MSB (M) and LSB (L) data input to the multiplier banks 542 have a 17-bit (1 sign bit+16 bit data input) format. In the embodiment shown in FIG. 5, the BB operation uses 32-bit data (a word having real and imaginary). To use shared 17-bit multiplier banks, a 32-bit data needs to be split into MSB part (16 bits) and LSB part (16 bits). After multiplication, MSB part and LSB part may be merged to represent results of 32 bit×32 bit, e.g., four 17-bit multipliers output merged to get one 32-bit x 32-bit result. In one or more embodiments, the formatting block 580 may comprise a shifter block 582 for shifting operation and an RND/ST block 584 to output the final output. It shall be noted that although the exemplary embodiment shown in FIG. 5 has 32SC (32 bit real and 32 bit imaginary) as input/output data format, a BB operation may be performed in various format, such as 8S (8 bit signed data), 16S (16 bit signed data), 32S (32 bit signed data), 8SC (8 bit real and 8 bit imaginary), 16SC (16 bit real and 16 bit imaginary), 32SC (32 bit real and 32 bit imaginary), etc. These variations shall be within the scope of the present patent document. Once the converged modem has the information of BB data entry structure, the converged modem may perform desired operations accordingly for BB operation.

As shown in FIG. 4 and FIG. 5, ML data path and BB data path may be shared at least partially for improved efficiency and hardware resources utilization. Given that BB applications involve complex (real and imaginary) multiplications with a higher BB precision (e.g., 16 bits) and ML applications use real multiplications with a lower ML precision (e.g., 8 bits), a data block of 128×32 bit may be configured for multiple BB data entries with each 32-bit data entry corresponding to a pair of a real data point and an imaginary data point, or for multiple ML data entries with each 32-bit data corresponding to 4 ML data entries. Thus the data block of 128×32 bit may present 128 BB data entries with each BB data entry comprising a pair of a real data point and an imaginary data point, or 512 ML data entries with each ML entry being an 8-bit data.

Accordingly, with both BB and ML operations implemented in a single chip using shared (or at least partially shared) pipeline and memory structure, a unified controller structure, e.g. prefetching data/code without different processing for ML and BB operations, may be maintained for improved efficiency and hardware resources utilization.

Figure 6:
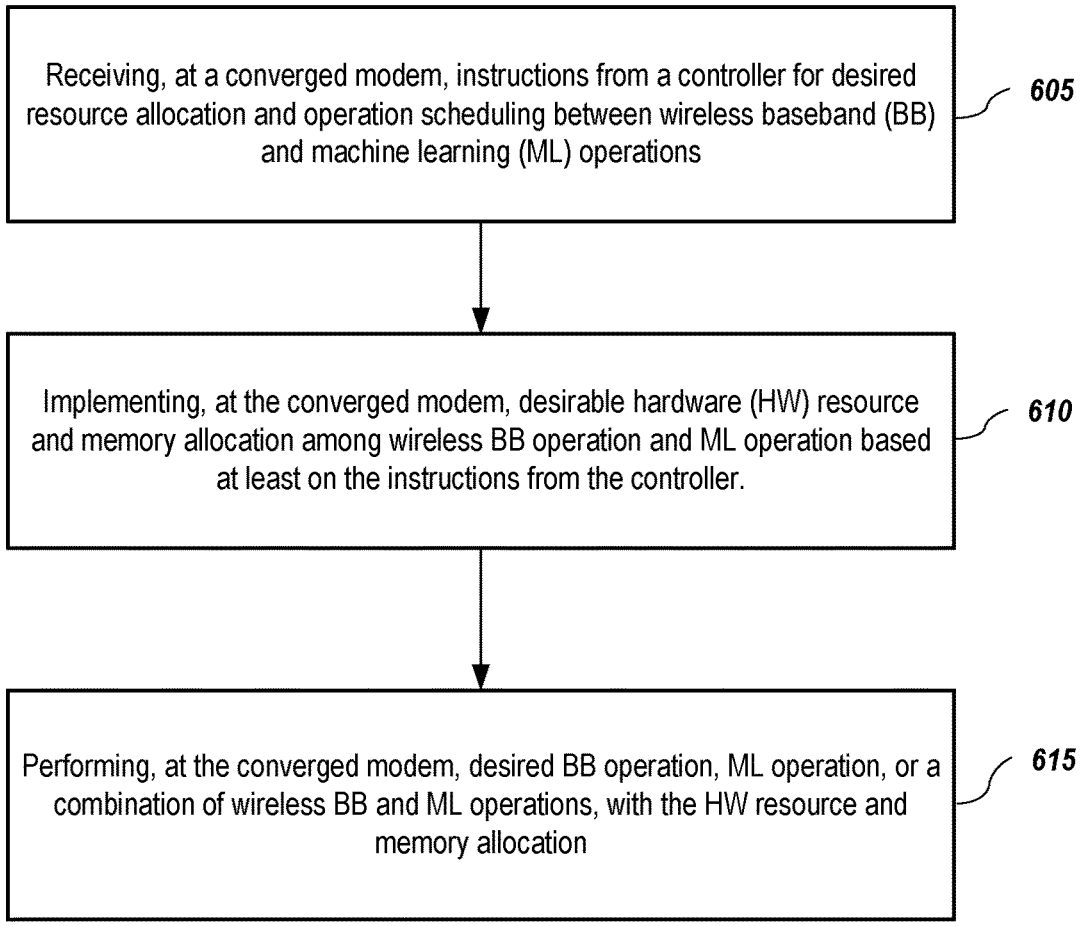
FIG. 6 depicts a process for performing converged BB and ML operations, according to embodiments of the present disclosure.

FIG. 6 depicts a process for performing converged BB and ML operations, according to embodiments of the present disclosure. In step 605, a converged modem receives instructions from a controller for desired resource allocation and operation scheduling between wireless BB operation and ML operation. The wireless BB operation may comprise processing of a wireless signal of various wireless standards, e.g., 5G NR, 4G LTE, or Wi-Fi, etc. The instructions may comprise instruction extensions for additional information, e.g., an indication of whether an incoming data flow is BB dataflow, ML dataflow, or a mixture of both, an indication of operation precision for the BB operation (e.g., 16 bits) and ML operation (e.g., 8 bits). As shown in the exemplary ML data path in FIG. 4 and BB data path in FIG. 5, a BB data flow have multiple BB data entries with each entry having 32-bit corresponding to a pair of a real data point (16 bits) and an imaginary data point (16 bits), while an ML data flow have multiple ML data entries with each entry having 8-bit for real data point only.

In an example for further explanation, to operate a simple MAC (multiply-accumulate calculation), the following operation in BB operation may be done:

umult(C, A, B)//C=A*B (all are vectors)
uredsum(D, C)//D=sum (C) (D is a scalar, C is a vector)

Accordingly, an instruction sequence may be made to perform any desired specific operation.

Similarly, the following ML operations may be done for a conv-2d operation:

uconvb(C, A, B) II C=conv2d(A, B), all are vectors
uconvb(F, D, E) II F=conv2d(D, E), all are vectors In one or more embodiments, the resource allocation and operation scheduling between BB and ML operations may be determined based on one or more policies, e.g., priority settings for BB and ML operations, latency requirement of specific applications in the BB or ML operations, current resource utilization in the modem, known scheduled operations to be performed in subsequent intervals, etc. The controller may allocate all resource for BB operation first and then for ML operation, maximizes resources to BB operations and allocate remaining (if any) resource to ML operation, or distributes resources between BB and ML operations for parallel processing, etc. Resource allocation may be pre-scheduled or determined dynamically on a desirable granularity, e.g., a frame level, a subframe level, a slot level, a block level, etc.

In step 610, the modem implements desirable hardware (HW) resource and memory allocation among BB operation and ML operation based at least on the instructions from the controller. The HW allocation may comprise distribution of multiplexers, multiplication banks, and accumulator blocks between BB operation and ML operation. Memory allocation may involve distribution of memory (volatile and non-volatile) storage between BB operation and ML operation. In step 615, the modem performs desired BB operation, ML operation, or a combination of BB and ML operations, with the hardware (HW) resource and memory allocation.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for converged wireless baseband and machine learning operation comprising:
receiving, at a modem, instructions from a controller for resource allocation and operation scheduling between a wireless baseband operation and a machine learning (ML) operation;
implementing, at the modem, hardware (HW) resource and memory allocation between the wireless baseband operation and the ML operation based at least on the instructions from the controller, the HW resource and memory allocation comprises distribution of multiplexers, multiplication banks, and accumulator blocks between the wireless baseband operation and the ML operation; and
performing, at the modem, a combination of the wireless baseband operation and the ML operation, with the HW resource and memory allocation, an ML data path for the wireless baseband operation is shared at least partially with a baseband data path for the wireless baseband operation;

wherein the resource allocation and operation scheduling between the wireless baseband operation and the ML operation is determined based on priority settings for the wireless baseband operation and the ML operation, latency requirement of specific applications in the wireless baseband operation or the ML operation, and current resource utilization in the modem.

2. The method of claim 1 wherein the wireless baseband operation comprises processing of a wireless signal of a wireless standard of 5G NR, 4G LTE, or Wi-Fi.

3. The method of claim 1 wherein the resource allocation and operation scheduling between the wireless baseband operation and the ML operation is further determined based on known scheduled operations to be performed in subsequent intervals.

4. The method of claim 1 wherein the HW resource and memory allocation comprises distribution of volatile and non-volatile memory storage between the wireless baseband operation and the ML operation.

5. The method of claim 1 wherein the instructions comprise instruction extensions for additional information.

6. The method of claim 5 wherein the additional information comprises an indication of whether an incoming data flow is a wireless baseband dataflow, an ML dataflow, or a mixture of both, or an indication of operation precision for the wireless baseband operation and the ML operation.

7. The method of claim 6 wherein the data format for the wireless baseband operation is 8S, 16S, 32S, 8SC, 16SC, or 32SC for each baseband data entry, the data format for the ML operation is 8 bits for each ML data entry.

8. A system for converged wireless baseband and machine learning operation comprising:
   a controller sending instructions for resource allocation and operation scheduling between a wireless baseband operation and a machine learning (ML) operation; and
   a modem coupled to the controller to receive the instructions, the modem is operable to implement hardware (HW) resource and memory allocation between the wireless baseband operation and the ML operation based at least on the instructions from the controller; and perform a combination of the wireless baseband operation and the ML operation, with the HW resource and memory allocation, an ML data path for the wireless baseband operation is shared at least partially with a baseband data path for the wireless baseband operation; and
   wherein the HW resource and memory allocation comprises distribution of multiplexers, multiplication banks, and accumulator blocks between the wireless baseband operation and the ML operation;
   wherein the resource allocation and operation scheduling between the wireless baseband operation and the ML operation is determined based on priority settings for the wireless baseband operation and the ML operation, latency requirement of specific applications in the wireless baseband operation or the ML operation, and current resource utilization in the modem.

9. The system of claim 8 wherein the wireless baseband operation comprises processing of a wireless signal of a wireless standard of 5G NR, 4G LTE, or Wi-Fi.

10. The system of claim 9 wherein the resource allocation and operation scheduling between the wireless baseband operation and the ML operation is further determined based on known scheduled operations to be performed in subsequent intervals.

11. The system of claim 10 wherein the HW resource and memory allocation comprises distribution of volatile and non-volatile memory storage between the wireless baseband operation and the ML operation.

12. The system of claim 10 wherein the instructions comprise instruction extensions for additional information, the additional information comprises an indication of whether an incoming data flow is a wireless baseband dataflow, an ML dataflow, or a mixture of both, or an indication of operation precision for the wireless baseband operation and the ML operation.

13. The system of claim 12 wherein the data format for the wireless baseband operation is 8S, 16S, 32S, 8SC, 16SC, or 32SC for each baseband data entry, the data format for the ML operation is 8 bits for each ML data entry.

14. A non-transitory computer-readable medium or media comprising one or more sequences of instructions which, when executed by at least one processor, causes steps for converged wireless baseband and machine learning operation comprising:
   receiving, at a modem, instructions from a controller for resource allocation and operation scheduling between a wireless baseband operation and a machine learning (ML) operation;
   implementing, at the modem, hardware (HW) resource and memory allocation between the wireless baseband operation and the ML operation based at least on the instructions from the controller, the HW resource and memory allocation comprises distribution of multiplexers, multiplication banks, and accumulator blocks between the wireless baseband operation and the ML operation; and
   performing, at the modem, a combination of the wireless baseband operation and the ML operations, with the HW resource and memory allocation, an ML data path for the wireless baseband operation is shared at least partially with a baseband data path for the wireless baseband operation;
   wherein the HW resource allocation and operation scheduling between the wireless baseband operation and the ML operation is determined based on priority settings for the wireless baseband operation and the ML operation, latency requirement of specific applications in the wireless baseband operation or the ML operation, and current resource utilization in the modem.

15. The non-transitory computer-readable medium or media of claim 14 wherein the resource allocation and operation scheduling between the wireless baseband operation and the ML operation is further determined based on known scheduled operations to be performed in subsequent intervals.

16. The non-transitory computer-readable medium or media of claim 14 wherein the HW resource and memory allocation comprises distribution of volatile and non-volatile memory storage between the wireless baseband operation and the ML operation.

17. The non-transitory computer-readable medium or media of claim 14 wherein the instructions comprise instruction extensions for additional information, the additional information comprises an indication of whether an incoming data flow is a wireless baseband dataflow, an ML dataflow, or a mixture of both, or an indication of operation precision for the wireless baseband operation and the ML operation.

* * * * *